Aug. 20, 1940.    C. W. PARKER    2,211,935
AUTOMATIC TIRE INFLATER
Filed Dec. 15, 1937    2 Sheets-Sheet 1
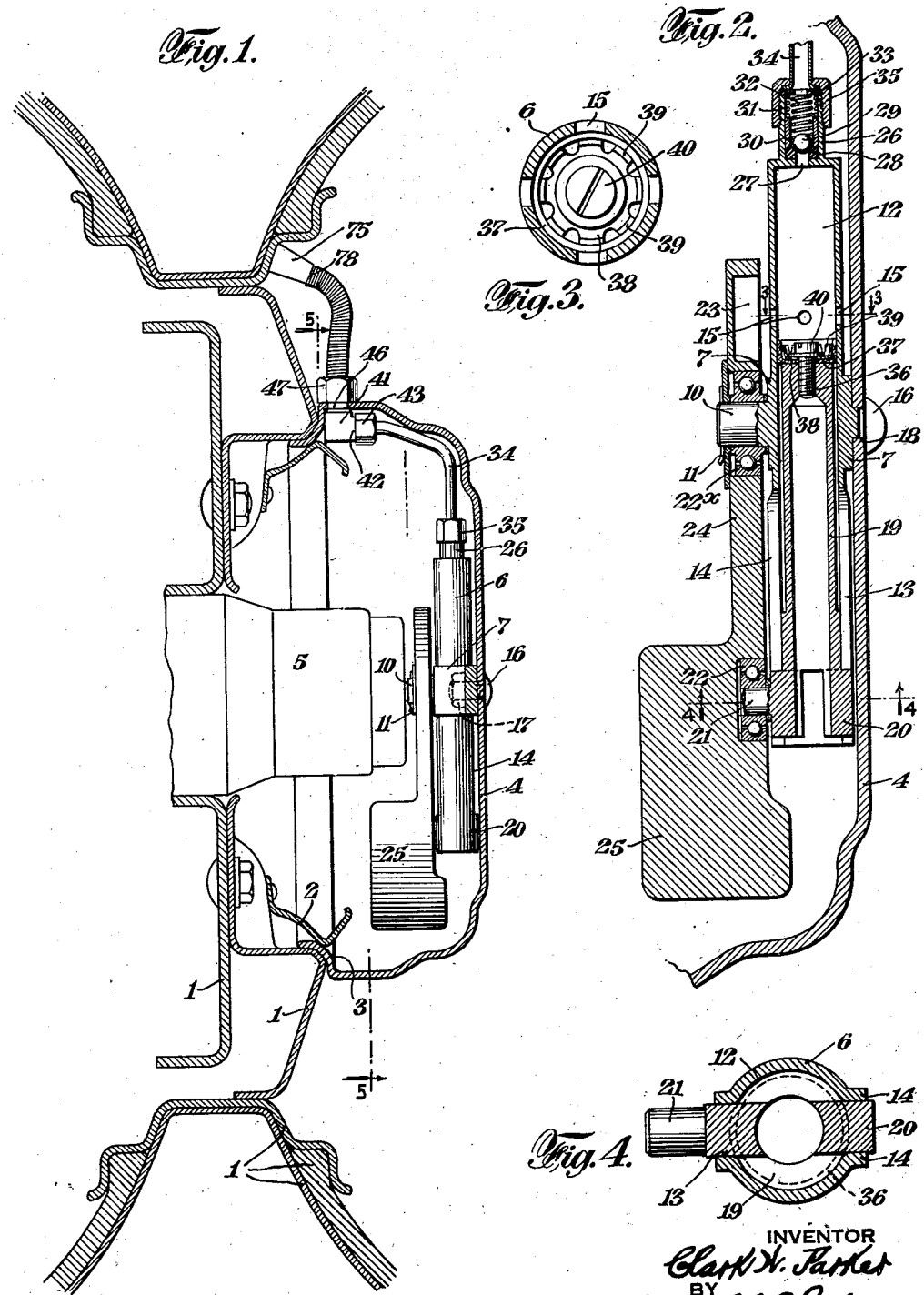
INVENTOR
Clark W. Parker
BY
Chas. McC. Chapman
ATTORNEY Aug. 20, 1940.  C. W. PARKER  2,211,935
AUTOMATIC TIRE INFLATER
Filed Dec. 15, 1937  2 Sheets-Sheet 2
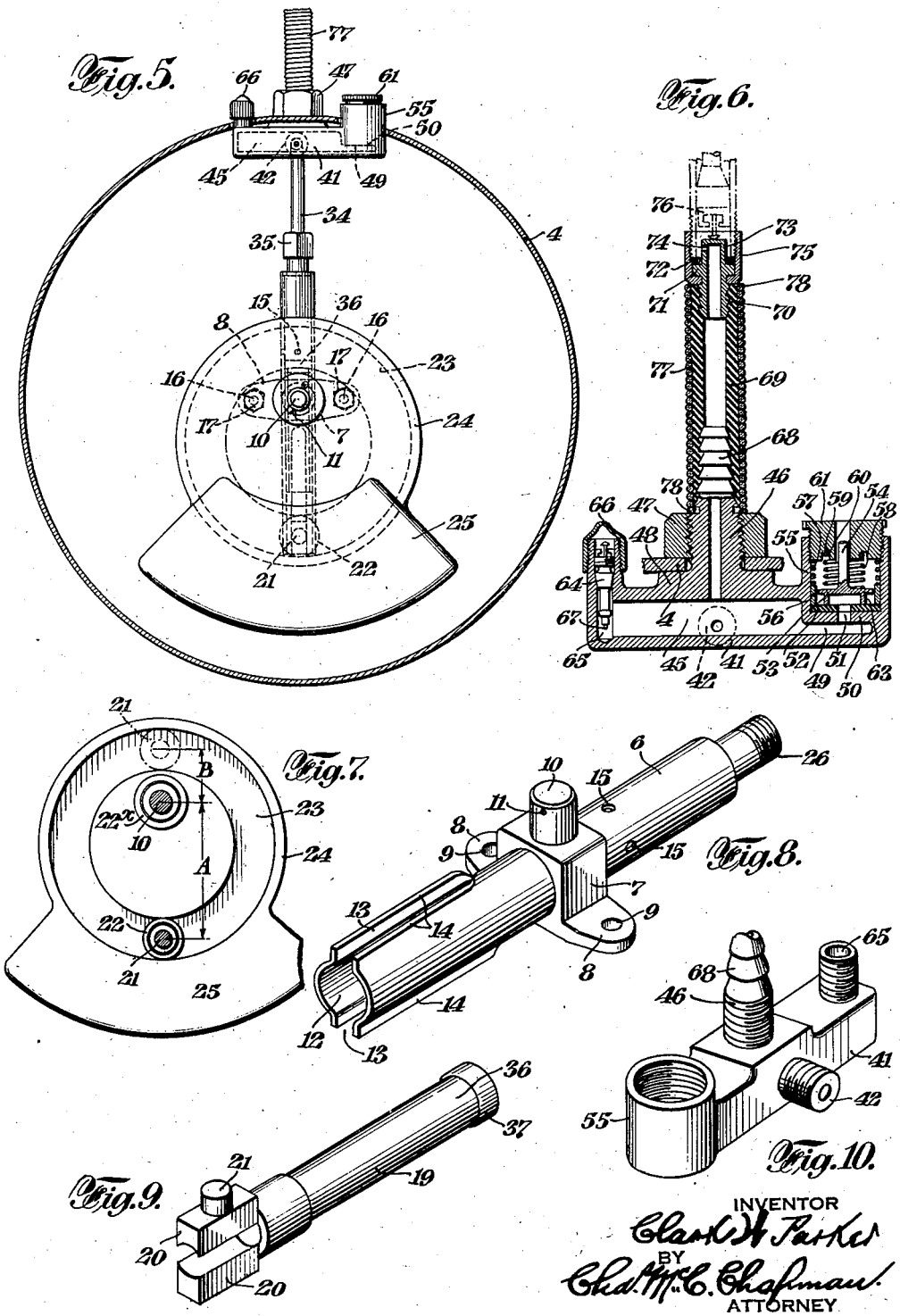
INVENTOR
Clark W. Parker
BY
Chas. McC. Chapman
ATTORNEY Patented Aug. 20, 1940

2,211,935

UNITED STATES PATENT OFFICE 2,211,935

AUTOMATIC TIRE INFLATER

Clark W. Parker, Dobbs Ferry, N. Y.

Application December 15, 1937, Serial No. 179,835

10 Claims. (Cl. 152—419)

This invention has reference to means or mechanism by which a pneumatic tire may be inflated, or kept inflated, or restored to its normal inflated condition after it has become deflated, or has been at rest, or the car or tire has been out of use for any period; and particularly my invention relates to a means carried by a hub-cap of an automobile of most modern types, shape or configuration, whereby the foregoing results are accomplished automatically.

In order that my invention may be clearly understood, it may be stated that such modern, roomy hub-caps may be utilized and, primarily, the invention includes a means, such as a pump, automatically operated while the car is traveling or the wheels are turning, which provides the air for inflating the tire of the pneumatic type. Additionally, my invention provides means by which a check-valve is combined with the pump and which insures the driving of the air unidirectionally and prevents the air from regurgitating or flowing in a reverse direction in any degree so that the tire may be inflated, or the air thereof be replenished when required from time to time, or the air thereof is held from leaking in any event. My invention also includes a relief valve by means of which the excess of air, which may be forced into the tire during the running of the car or the wheel, can be eliminated or can be relieved or exhausted or allowed to escape, so that the inflation of the tire will be held at normal or at maximum, or the tire can be restored to the proper condition, or regulated or maintained at a given number of pounds to the square inch, according to the size or character of the tire and the requirements thereof. The invention also includes a means by which, from time to time, the number of pounds per square inch which is held by the tire may be tested for experimental or other purposes; and all the foregoing mechanism is contained within the confines of the hub-cap of the wheel, so that it may be demounted from the wheel at any time, and so that it may be protected by the hub-cap, and in order that the various parts may be readily accessible or reached at any predetermined time.

Among the objects of my invention may be noted the following: to provide a pump which constantly operates to inflate the tire during the rotation of the wheel, or during the running of the car on which the wheel is mounted; to provide means by which the back flow of the air may be automatically checked at all times during the operation of the pump; to provide means by which the air thus pumped and checked may be automatically conveyed directly to the usual inner tube of a pneumatic tire; to provide an escape valve so combined with the other devices that an excess of air will be allowed to escape and still the pressure within the tire may be maintained at normal, or the amount of air per square inch may be regulated or determined; to provide means, in combination with the other mechanism which will enable a test of pressure to be made and ascertained at any predetermined time while the car or wheel is inactive; and to provide all these means and mechanisms in the ordinary hub-cap where they will be out of sight, protected from grit, sand, mud and other means of clogging or soiling the same, save only the few parts, presently described, which are necessarily exposed outside the hub-cab in order that certain of the objects or requirements above noted may be attained, and the hub-cap and parts carried thereby may be readily demounted.

With the above objects in view and others which will be detailed during the course of this description, my invention consists in the parts, features, elements and combinations thereof hereinafter described and claimed.

In order that my invention may be clearly understood, I have provided drawings wherein Fig. 1 is an elevational view, partly in section, of a portion of a conventional hub-cap and wheel having my tire inflater applied thereto;

Fig. 2 is an enlarged sectional view showing various parts of my apparatus;

Fig. 3 is a view showing in sectional elevation the cup-washer and expander therefor carried by the piston;

Fig. 4 is a view, showing, in sectional elevation, details of the crank-pin for actuating the pump-piston;

Fig. 5 is a view showing, in sectional elevation, certain details of my invention as viewed from the left of Fig. 1, the section being taken approximately on the line 5—5 of said figure, the arrows indicating the direction of sight;

Fig. 6 is an enlarged view showing the details of the escape-valve, gaging valve and coupling connection of the inflater, the view being in sectional elevation;

Fig. 7 is a face view showing the details of the cam or eccentric in combination with the weight by means of which the pump is actuated, parts being broken away due to the limitations of the sheet;

Fig. 8 is a perspective view of the piston-cylinder or pump-housing and supporting means therefor;

Fig. 9 is a similar view of the piston and actuating head therefor; and

Fig. 10 is a perspective view of the escape-valve casting.

Referring to the drawings by reference characters:

The numeral 1 indicates the parts of a conventional wheel of a Pontiac car, having the circularly arranged spring-fingers 2, over which is sprung the flange 3, of the hub-cap 4 to which is applied the various parts of my tire inflater, and into which cap the axle structure 5 may extend, showing an abundance of room for the inflater. The cap 4 is sprung onto the outside of said fingers 2, and on them it fits and is tightly held in the usual way. The cap 4 rotates with the wheel and drives the inflater, as will be readily seen from the following description. It should be noted, primarily, that my inflater can be applied to the hub-cap of most automobiles, because the average car has a bulged or rounded hub-cap adapting my structure to be readily applied thereto. This is important from the commercial standpoint, as can be readily seen.

Mounted centrally on the inside of the hub-cap is a housing or hollow cylindrical construction 6, such as shown in Figure 8, and this housing or cylinder is provided with an integral support, or casting, 7, having two oppositely extending ears 8 in the same plane, in which ears are apertures 9. The casting 7 is provided with a journal-pin 10, extending at a right-angle thereto on the side opposite the ears and said pin has an aperture through it to receive a cotter pin 11 for a purpose presently described. The housing 6 is made hollow from end-to-end, as at 12, and beyond the support 7 is provided with parallel slots 13, the edges of which are out-turned to provide accentuated guiding members 14. At a predetermined point the housing 6 is provided with a plurality of circularly arranged apertures 15. The housing 6 is held in place in the cap 4, by screw-bolts 16, passing through the cap from the outside and the apertures 9 of the ears 8. The bolts 16 are held by nuts 17, screwed thereon. The cap 4 on its inside is provided with any angular formation 18, to receive the casting 7, similarly formed, so that it will surely turn without play together with the cap. Within the housing the piston 19 slides freely, guided by the cross-heads 20 directly by the slots 13 and members 14. Projecting from one side of the cross-head is a crank-pin 21 entering a ball-bearing structure 22, which travels in an eccentric groove 23 formed in a disk 24, having a massive weight 25 carried thereby. The disk 24 is journaled eccentrically on pin 10, the ball-bearing 22ˣ being mounted on said pin to provide for smooth and approximately frictionless bearing for running within the hub of the cam. This structure enables the disk and weight to hang pendent on the pin 10 enabling the two to have only a slight vibration on the journal pin 10. At its closed end the housing is provided with a reduced, hollow portion 26, carrying a check-valve structure shown in detail in Figure 2. Therein it will be seen that the closed end of the housing has an aperture 27 in which is seated a thick, perforated rubber disk 28 affording a valve-seat for a ball-valve 29, located within a ring 30, bearing at one end on the valve-seat and having at the other end a spring 31 which forces the ring firmly upon the valve-seat and holds the latter from being displaced to avoid leaking. A spring 32 within the ring engages the ball 29, and the whole structure is leveled by a washer 33, which bears upon the flared end of a flexible tube 34. Placed upon this valve structure and holding together all the parts just described, is a screw-threaded cap 35 which may be tightened to any extent desired.

The piston 19 is provided at its head-end with a threaded passage 36 therethrough. At this end of the piston a perforated cup-washer 37 is applied and within this washer is placed a perforated expanding cup 38 or device, having a circular series of spring fingers 39. The washer and expander are held together by the flanged head of a screw 40, threaded into the passage 36, and driven firmly against the washer 37 and cup 38.

Carried by the hub-cap just back of the rim 3, is a chambered, elongated casting 41 shown in detail in Figure 10, having an externally threaded inwardly projecting teat 42 to which the flexible tube 34 is connected by its outer flared end, said tube-end being held by a screw-threaded cap 43. This casting has the elongated chamber 45 at one end of which is the escape-valve and at the other end the gage-valve. The casting is held in place by an enlarged stem 46 extending through the hub-cap 4, and is held, by the nut 47 and enlargement 48, rigidly in place.

The escape-valve consists of a chamber 49 extending under a support 50, having passage 51, on which is mounted a perforated, rubber valve-seat 52, cooperating with a flanged valve 53, having an outwardly extending, elongated stem 54. These parts are contained within a circular outwardly extending chamber 55, containing a ring 56 surrounding the valve and having a spring 57, bearing thereon. A spring 58 also bears on the head of the valve within the circumference of the ring and has its other end held by a coil 59 of the spring in a groove 60 in the bottom of an externally threaded nut, 61. The spring 57 holds the ring 56 against the valve-seat 52 preventing it from being displaced, and the spring 58 holds the valve 53 upon its seat. The nut 61 has a guiding passage centrally thereof for the stem 54 of the valve, the excess air entering the chamber 45 and passing successively through the passage 51, the valve-seat, lifting the valve 53 and escaping around the elongated stem 54 and through the passage in the nut. The valve head has the circular flange 63, which firmly bites into the seat 52, and surrounds the passage therethrough. Any air, backing into chamber 45, will have a tendency to unseat the valve 53 and escape around its stem; but, the structure is such as to hold any ordinary or tire pressure and can be regulated to open under any desired pressure in the tire. By turning the nut 61, pressure can be regulated on both springs 57 and 58, holding the valve-seat and the valve, and regulating the air pressure.

The opposite end of the casting 41 has the gage-valve 64, mounted therein, its chamber 65 communicating with the chamber 45, so that at any time desired the pressure in the tire can be ascertained. This is a standard structure and operates in the usual way; that is to say, when a reading is desired the cap 66 is removed and a gage-device is applied which will depress the stem 67 enabling a reading to be taken, the air in the chamber 45 entering the valve-body when the stem 67 is depressed.

From the enlarged projection 46 extends an integral stem the circumference of which is tapered and armored, as at 68, so that it may frictionally engage the tubing 69 of the stem, and the opposite end of the stem is reversely armored as at 70 to enable it to grip the tubing and this outer end is provided with a circular flange 71, on which is seated a leather washer 72. Above the washer the stem is extended and closed, as at 73, but laterally is provided with a small aperture 74. Under the flange 71 is held an internally threaded socket into which the tire-valve stem 76, shown in dotted lines, is fastened. The closed end 73 of the stem operates to contact and open the valve 76 of the tire-valve. Surrounding the tubing 69 is a tubular-wire armor 77 which enables the tubing to flex, but which protects the same from wear and tear.

From the foregoing it will be seen that my apparatus has an entirely novel operation, viz: that the weight and the cam have a short oscillation as the wheel and hub-cap turn which latter cause reciprocation of the piston 19 within the housing 6. The hub-cap 4 is fixed to the wheel and in its rotation will drive the housing with it and thus cause the piston to be reciprocated within the housing under the control of the cam and weight which remain approximately stationary. This new mode of operation provides for the constant pumping of the piston within the housing under the control of the hub-cap and its movement, but guided by the stationary cam and weight. This action continues as long as the wheel and its hub-cap are in operation and regardless of the direction of rotation and regardless of the amount of air which may be pumped by the piston and its housing. It will be seen that if the air, pumped into the tire, is in excess of that required for holding its inflation normal, or at regulated pressure, the excess will be allowed to automatically escape through the escape-valve mechanism of Figure 6 and its connection. At any time the car is brought to a standstill, if it is desired, the amount of air pressure within the tire can be tested or gaged by merely applying an ordinary air gage to the fixture at 64, by removing the cap 66 which is screwed into place and provided with means such as the valve and cap to prevent it from escapage. The connection between the tire-valve and the stem 68, is provided to prevent ravages thereon during operation; and at its opposite ends the wire structure 77, is compressed and buried within the rubber tube, which also binds the two opposite ends to the respective stem structures.

In Fig. 7 I have shown the travel of the crank-pin 21 in the eccentric groove 23 of the disk 24 and the arrowed line A indicates between the pin 21 and the journal pin 10 the amount of reciprocation which the piston will have during the rotation of the hub-cap and housing 6. The arrowed line B indicates the amount of angular travel between the pin 21 and the journal pin 10 indicating the amount of vibration given the eccentric and its weight. As the piston is reciprocated within the housing 6, its head passes the apertures 15 in the housing, thus forcing the air past the ball 29 of the check valve, when moving in one direction, and causing suction in the chamber 12, with a tendency of the air to escape and easing the motion of the piston as the latter passes the apertures in the opposite direction. Thus the piston has very much the action of a dash-pot, preventing retardation in the movement of the piston at one time and at another time causing the air to be driven with great force through the check-valve structure. The ball bearings surrounding the journal pin 10 and the crank-pin 21 provide for ease of action, quietude in operation, and eliminating wear on the various parts. The piston is bored for the purpose of giving lightness.

Having thus described my invention, what I claim is:

1. In combination with the hub-cap of an automobile wheel, a pump housing carried by said cap, an eccentric and weight journaled on the housing, a piston included in the pump mechanism, and the eccentric for actuating the same carried by the weight.

2. In combination with a hub cap of an automobile wheel, a pump housing having a piston working therein, means for supporting the housing on the hub cap for rotation therewith, a weight pivotally mounted on said pump housing and having a cam slot formed therein which is eccentric with respect to the hub cap center, and means operating in said cam slot for actuating said piston in said pump housing.

3. In combination with a detachable hub cap of an automobile wheel, a pump housing carried by said cap, a weight journaled on the housing, a piston included in the pump mechanism, an eccentrically mounted cam slot formed in said weight, and a roller operating in said cam slot for actuating said piston.

4. In combination with a standard hub cap of an automobile wheel, a pumping mechanism, means for securing said pumping mechanism in a position adjacent to the inner face of said hub cap, an eccentric mounted on the pumping mechanism, and a depending pivotally supported weight having a complemental portion engaging said eccentric.

5. In combination with an automobile wheel, a tire inflating mechanism including a pump having a piston working therein, a weight pivotally associated with the pump, an eccentric cam slot formed in said weight and means operating in said cam slot for actuating the piston of said pump.

6. A motor vehicle tire inflater comprising a pump housing having a piston working therein, supporting means for the pump housing including means for removable attachment to a portion of a vehicle wheel in such manner as to rotatively travel therewith, a reaction weight, means for pivotally supporting said reaction weight, and an eccentric for actuating the piston, said eccentric rotatively engaging said weight.

7. A motor vehicle tire inflater comprising a pump mechanism including a casing having a piston working therein, supporting means for said pump mechanism having means for removable attachment to a portion of a vehicle wheel in such manner as to rotatively travel therewith, means for pivotally supporting a free swinging reaction weight adjacent to said pump casing, and an eccentric connected with said piston and rotatively mounted in said weight in such manner as to react against the latter during said travel of the pump mechanism.

8. A motor vehicle tire inflater comprising a pump mechanism including a casing having a piston working therein, supporting means for said pump mechanism having means for attachment to a portion of a vehicle wheel in such manner as to rotatively travel therewith, a free swinging reaction weight mounted adjacent said pump mechanism and having an eccentric channel therein, and an eccentric connected with said piston and rotatively mounted in said channel in such manner as to react against the weight during said travel of the pump mechanism.

9. A motor vehicle tire inflater comprising a pump mechanism including a casing having a piston working therein, supporting means for said pump mechanism having means for attachment to a portion of a vehicle wheel in such manner as to rotatively travel therewith, a freely swinging reaction weight pivotally supported by said pump mechanism, an eccentric rotatively supported by said weight, and means connecting the eccentric with said piston in such manner as to reciprocate the piston during said travel of the pump mechanism.

10. A motor vehicle tire inflater comprising a pump mechanism including a casing having a piston working thereon, supporting means for said pump mechanism having means for attachment to a portion of a vehicle wheel in such manner as to rotatively travel therewith, said supporting means including a pivot member, a free swinging reaction weight supported by said pivot member, an eccentric rotatively mounted in said weight in such manner as to react against the latter during said travel of the pump mechanism, and means connecting the eccentric and the weight.

CLARK W. PARKER.